United States Patent [19]

Lambregts et al.

[11] 4,419,732
[45] Dec. 6, 1983

[54] METHOD AND APPARATUS FOR AN AIRCRAFT INNER LOOP ELEVATOR CONTROL SYSTEM

[75] Inventors: Antonius A. Lambregts, Issaquah; Rolf Hansen, Bellevue, both of Wash.

[73] Assignee: The Boeing Company, Seattle, Wash.

[21] Appl. No.: 301,911

[22] Filed: Sep. 14, 1981

[51] Int. Cl.³ .......................... G06G 7/78; G05D 1/12
[52] U.S. Cl. ................................. 364/428; 364/430; 340/26; 318/583; 244/183; 244/186; 244/187
[58] Field of Search ............... 364/428, 429, 430; 340/26, 27 NA; 318/583; 78/178 T; 244/183, 186, 187

[56] References Cited

U.S. PATENT DOCUMENTS

| | | | |
|---|---|---|---|
| 3,333,795 | 8/1967 | Hattendorf et al. | 364/430 X |
| 3,447,765 | 6/1969 | Doniger et al. | 364/430 X |
| 3,523,663 | 8/1970 | Doniger et al. | 244/187 |
| 3,578,269 | 5/1971 | Kramer | 244/187 |
| 3,601,339 | 8/1971 | Watson | 244/187 |
| 3,604,908 | 9/1971 | Loome et al. | 364/430 |
| 3,626,163 | 12/1971 | Dommasch | 244/187 X |
| 3,652,835 | 3/1972 | Devlin et al. | 244/187 |
| 3,801,049 | 4/1974 | Simpson et al. | 244/187 |
| 3,847,328 | 11/1974 | Simpson et al. | 364/429 X |
| 3,892,373 | 7/1975 | Doniger | 364/429 X |
| 3,918,662 | 11/1975 | Vircks et al. | 364/429 X |
| 3,976,267 | 8/1976 | Meyer et al. | 364/430 X |
| 4,006,871 | 2/1977 | Simpson | 364/428 X |
| 4,104,612 | 8/1978 | Lowe | 364/428 X |
| 4,127,248 | 11/1978 | Boone et al. | 364/428 X |
| 4,141,522 | 2/1979 | Lambregts et al. | 364/429 X |
| 4,164,340 | 8/1979 | Simpson | 364/429 X |
| 4,326,253 | 4/1982 | Cooper et al. | 364/428 X |
| 4,354,237 | 10/1982 | Lambregts et al. | 364/428 |
| 4,357,661 | 11/1982 | Lambregts et al. | 364/430 |

*Primary Examiner*—Mark E. Nusbaum
*Assistant Examiner*—William G. Niessen
*Attorney, Agent, or Firm*—James P. Hamley; Bernard A. Donahue; Nicolaas DeVogel

[57] ABSTRACT

An improved inner loop control is disclosed for use in an aircraft pitch axis control system. Signals representative of vertical acceleration and pitch rate are complementary filtered and summed to produce an "inner loop" damping signal which is combined with "outer loop" command signals to produce an elevator control signal. The improved approach provides higher outer loop control law gains and better system stability, resulting in higher control bandwidth and tighter command tracking, especially in turbulence.

7 Claims, 18 Drawing Figures

METHOD AND APPARATUS FOR AN AIRCRAFT INNER LOOP ELEVATOR CONTROL SYSTEM

BACKGROUND OF THE INVENTION

The present invention pertains to the aircraft guidance art and, more particularly, to a system for controlling aircraft flight during landing flare.

A critical portion of aircraft landing trajectory is commonly known as flare-out or flare. Flare is that portion of the landing trajectory between the fixed angle glideslope and aircraft runway touchdown. Thus, it is desirable, particularly for commercial aircraft that the flare profile depart smoothly from the fixed angle glideslope approach thereby providing a smooth transition to runway taxiing.

Aircraft automatic landing flare performance is determined by a flare control law. In the prior art, such control laws have not exhibited satisfactory stability and precision command tracking. As a result, the actual touchdown point of the aircraft on the runway has varied considerably. This is undesirable both for safety reasons and because there are tightening regulations on aircraft landing dispersion.

Thus, there has been a long felt need in the aircraft guidance control art for improved aircraft flare control.

SUMMARY OF THE INVENTION

It is an object of this invention, therefore, to provide an improved apparatus and methods for producing an aircraft inner loop elevator control signal.

It is a particular object of the invention to provide an improved aircraft inner loop elevator control system which allows higher outer loop control law gains and better system stability and results in higher control bandwidths with tighter command tracking, especially in turbulence.

Briefly, according to the invention, improved aircraft control inner loop damping signals are developed and combined with outer loop command signals to produce an elevator control signal. The improved inner loop apparatus comprises means for producing an aircraft vertical acceleration signal $\ddot{h}$, means for producing an aircraft pitch rate signal $\dot{\theta}$, a low pass filter to attenuate the vertical acceleration signal $\ddot{h}$ above a predetermined frequency $\omega$, a high pass filter to attenuate the pitch rate signal $\dot{\theta}$ below said predetermined frequency $\omega$, and a summer means that sums the filtered $\ddot{h}$ and $\dot{\theta}$ signals to thereby produce the improved inner loop damping signal.

BRIEF DESCRIPTION OF THE DRAWINGS

FIGS. 3 and 4 are graphs comparing the frequency response characteristics of the systems shown in FIGS. 1 and 2;

DETAILED DESCRIPTION OF THE PREFERRED EMBODIMENTS OF THE INVENTION

During the course of comprehensive study to improve the automatic landing flare performance of aircraft, various means were investigated to increase the control bandwidth and improve the frequency response to turbulence of various flare control law configurations.

Figure 1:
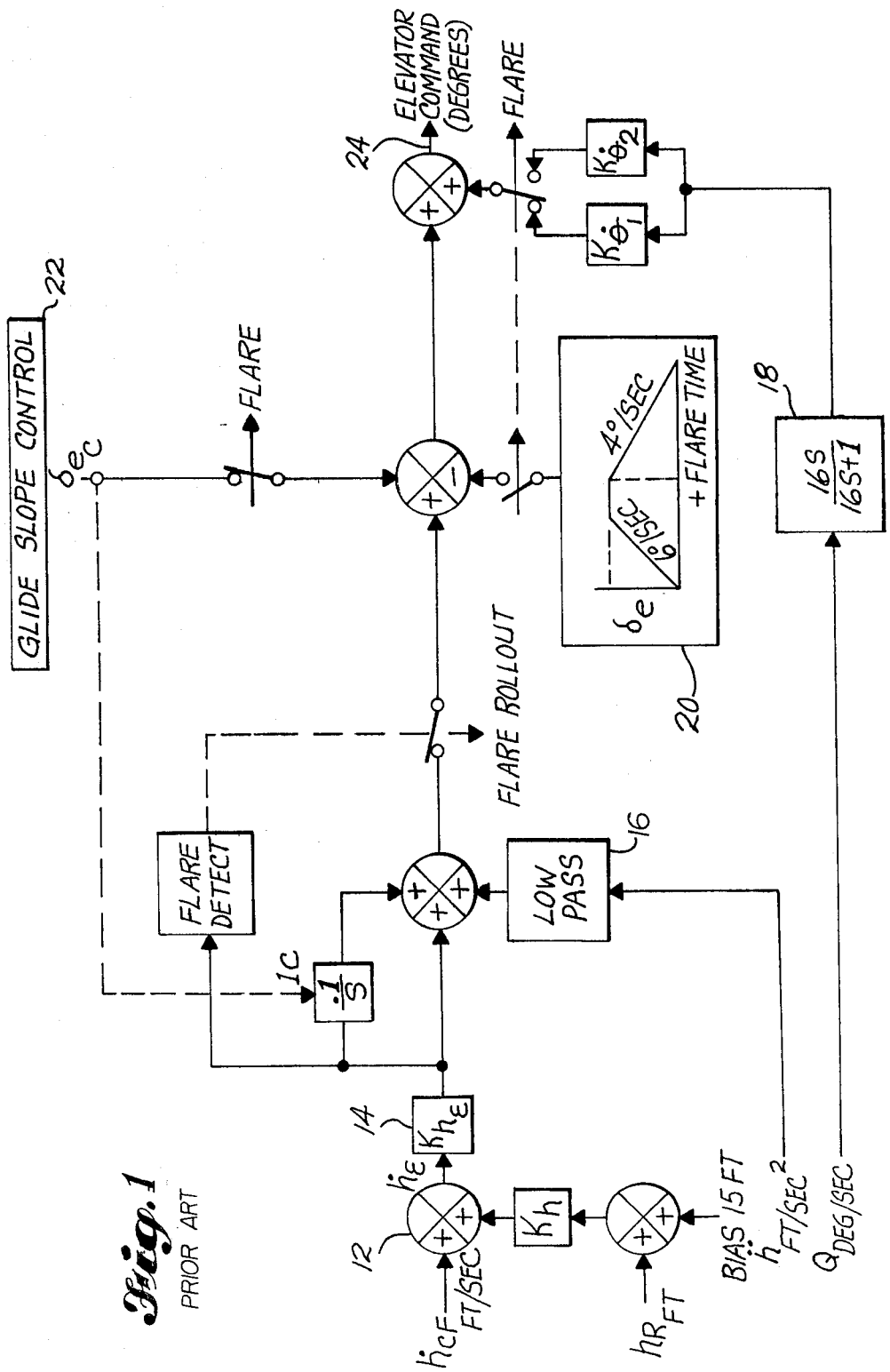
FIG. 1 illustrates a typical prior art aircraft flare-out control system.

In these investigations, it was found that substantial improvements could be made if the control law gains, in a base line design using an inner loop with vertical acceleration and pitch rate feedback, could be raised. FIG. 1 illustrates a base line design. A detailed description of the operation of the base line design shown in FIG. 1 will not be presented here since it would be readily understood by anyone of ordinary skill in the art. Four signals are input to the system: $h_{CF}$, representing sink rate derived by complementary filtering from h and $h_{baro}$, $h_R$ representing radio altitude, $\ddot{h}$ representing vertical acceleration and $\dot{\theta}$ representing pitch rate. The signals are processed, as shown, through summing circuits, such as summer 12, gain blocks, such as block 14, filter blocks, such as blocks 16, 18 and logic block 20.

The glideslope signal $\delta_{ec}$ is produced by a glideslope control block 22, such apparatus being well known in the prior art. This signal is coupled through to the output elevator command line 24 until such time as the various switches are activated, thereby initiating the aircraft flare. During flare-out, the signals received at the system's input are processed through the circuitry shown to produce the elevator command signal at output line 24.

Figure 2:
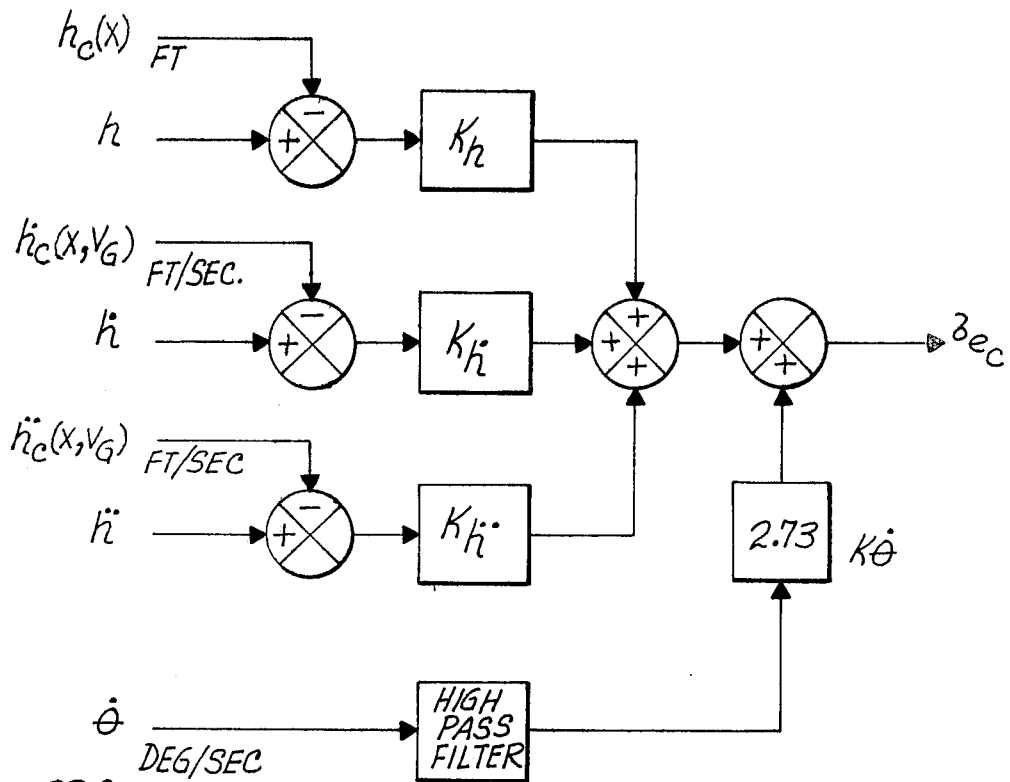
FIG. 2 illustrates a basic flare trajectory law to track a flare trajectory specified by the commands $h_c$, $\dot{h}_c$ and $\ddot{h}_c$.
Figure 4:
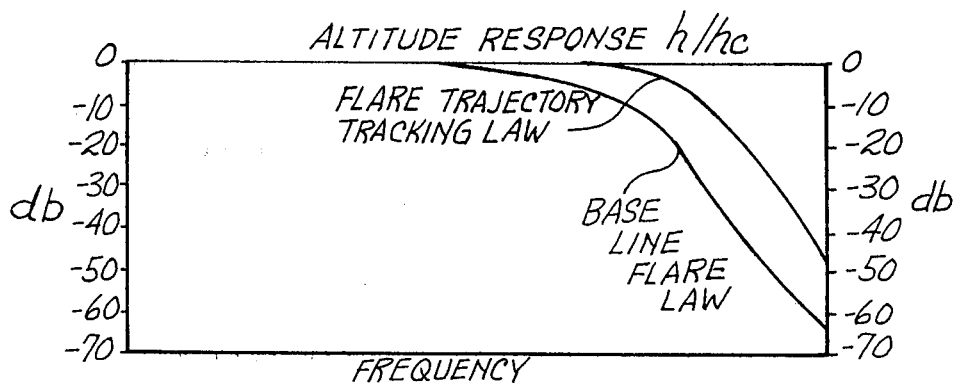
Figure 5:
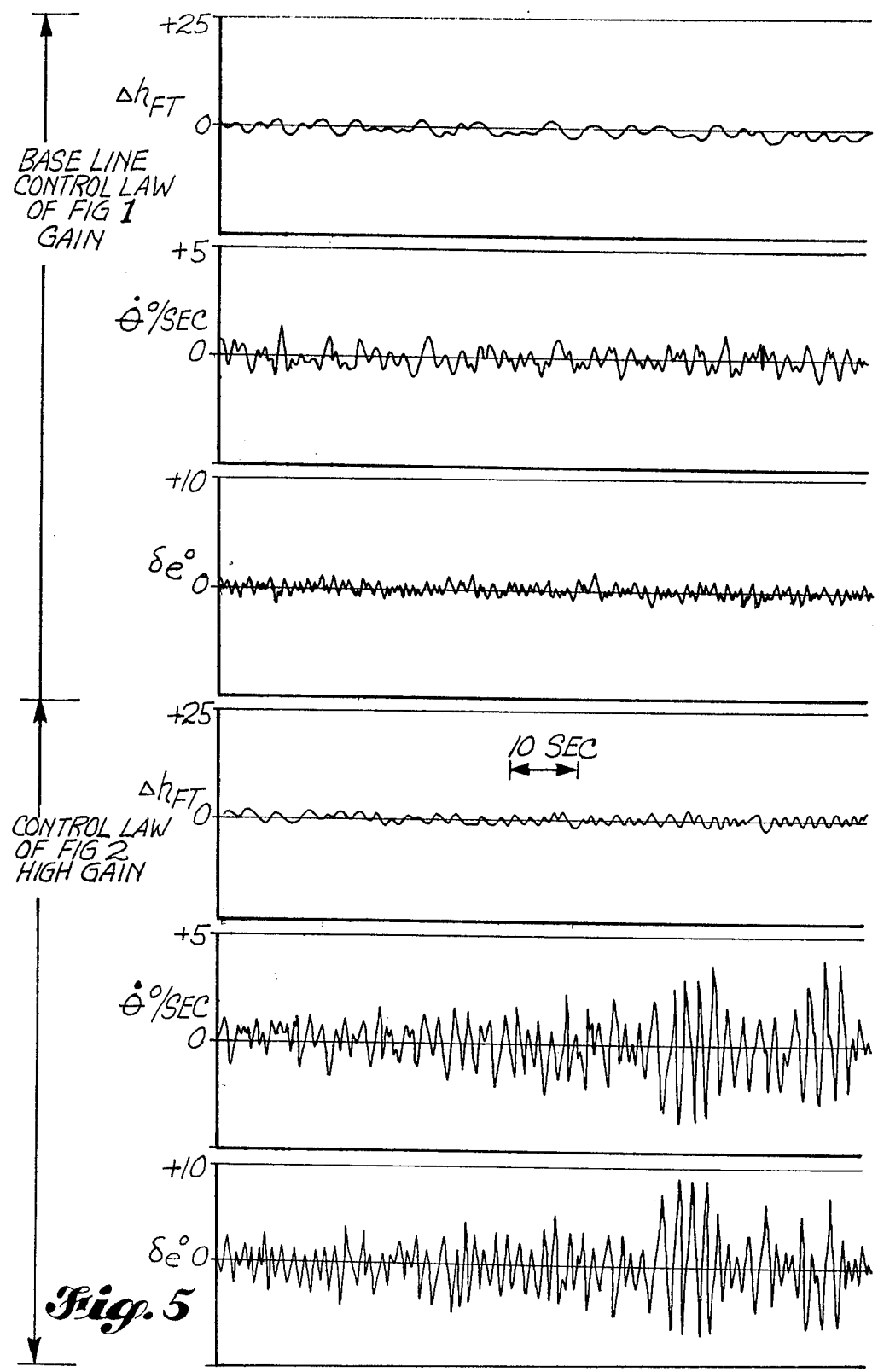
FIG. 5 illustrates the response characteristics of the systems of FIGS. 1 and 2.

FIG. 2 illustrates a flare trajectory tracking law allowing gains higher than the system of FIG. 1. As is shown in FIGS. 3 and 4, the altitude tracking error $\Delta h$ of the control law of FIG. 2 due to gust is substantially lower and the control bandwidth is substantially increased. However, when the design of FIG. 2 was tested in the simulator with detailed airplane and sensor characteristics, it was found that this system suffered from low damping and high elevator activity in turbulence. These problems were traced to the vertical acceleration ($\ddot{h}$) and pitch rate ($\dot{\theta}$) feedback inner loop. In particular, the vertical acceleration signal included signal components attributable to the location of the sensor relative to the airplane's center of gravity. Further, the vertical acceleration signal was filtered to reduce high frequency noise components. The combination of these two factors resulted in poor inner loop signal quality to damp the high frequency pitch mode. It was found that the sensitivity to the above affects had become much greater by the increase of the overall control law gains. Also, the high level of vertical acceleration gain increased the elevator activity to an unacceptable level (see FIG. 5). However, FIG. 5 shows that the altitude tracking of the control law of FIG. 2 is considerably improved over the base line system.

These deficiencies were overcome, while the higher gains and the associated performance benefit were retained by elimination of the $\ddot{h}$ signal in the higher frequency range and substitution of pitch attitude information which provides more effective damping information in the higher frequency range.

Figure 6:
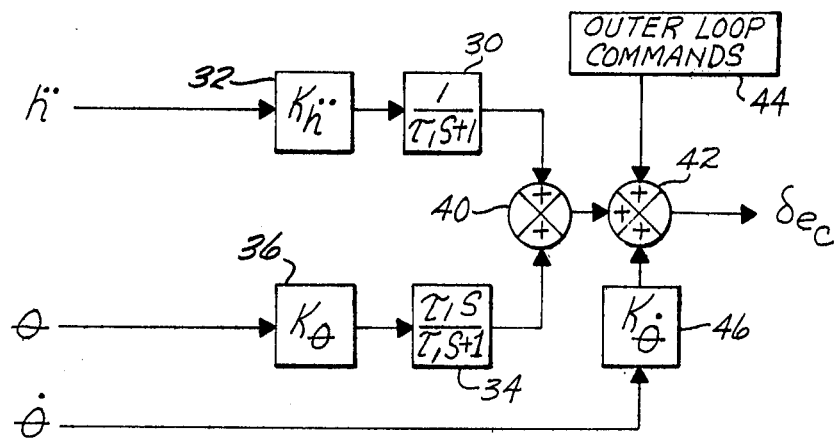
FIG. 6 is a block diagram illustrating one implementation of the $\ddot{h}/\dot{\theta}$ inner loop elevator control system.

FIG. 6 illustrates one manner of accomplishing this goal. Here, the vertical acceleration signal $\ddot{h}$ is rolled off at frequencies $\omega > 1/\tau$ by the lag circuit 30 after being amplified by a gain factor $k_{\ddot{h}}^*$ in gain block 32. A signal $\theta$ representative of aircraft pitch attitude is brought in at frequencies $\omega > 1/\tau$ by the washout circuit 34 which is preceded by a gain block 36. Thus, the two signals are summed in summer 40 and passed to a summer 42 where it is combined with conventional outer loop command signals from block 44 and the pitch rate signal $\dot{\theta}$ as amplified in gain block 46. The resultant output from summer 42 is the elevator control signal $\delta_{ec}$.

The inner loop configuration of FIG. 6 may be reduced to an alternate form by rearranging the pitch and pitch rate terms, and considering $s\theta = \dot{\theta}$. Thus, $$K_{\dot{\theta}}\dot{\theta} + K_\theta \frac{\tau_1 S}{\tau_1 S + 1} \theta = K_{\dot{\theta}'} \frac{1 + \tau_2 S}{1 + \tau_1 S} \dot{\theta} \text{ wherein} \quad (1)$$

$$K_{\dot{\theta}1} = K_{\dot{\theta}} + \tau_1 K_\theta \text{ and } \tau_2 = \frac{K_{\dot{\theta}}\tau_1}{K_\theta \tau_1 + K_{\dot{\theta}}}$$

Figure 7:
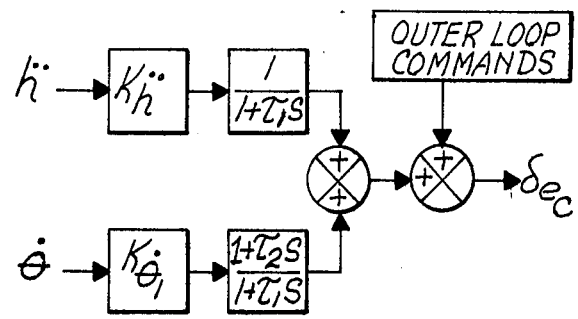
FIGS. 7 and 8 are block diagrams illustrating implementation of the system of FIG. 6 without the requirement of an independent pitch attitude signal.
Figure 8:
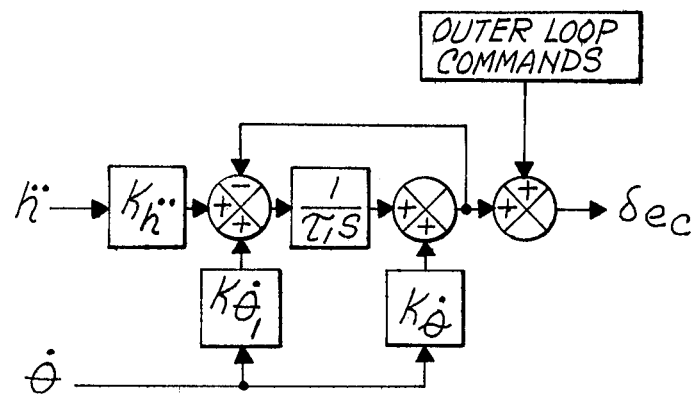

Implementation of the control law can, therefore be accomplished without the need for an additional pitch attitude signal, as is shown in FIG. 7. Alternatively, the $\ddot{h}$ and $\dot{\theta}$ filters of FIG. 7 may be implemented as shown in FIG. 8.

The $\theta$ or lagged $\dot{\theta}$ signal does not need additional noise filtering, is not sensitive to sensor location and is an inherently more suitable damping signal for the high frequency pitch modes. This "complementary lagged $\ddot{h}/\dot{\theta}$ signal processing" eliminates the discussed problem in achieving a well damped high gain control law. It substantially maintains the superior turbulence response characteristics of a pure $\ddot{h}/\dot{\theta}$ inner loop system in the lower frequency range and improves the response in the high frequency range due to the elimination of ineffective elevator activity.

A more sophisticated way of replacing the high frequency $\ddot{h}$ signal component with pitch attitude information was developed as follows. Using the linear equations of motion, the vertical acceleration signal can be expressed as a linear function of state variables governing the airplane dynamics. Thus, $$\ddot{h} = K_1 h + K_2 \dot{h} + K_3 \theta + K_4 \dot{\theta} + K_5 \Delta V + K_6 \delta_e + K_7 \Delta T + K_8 u_g + K_9 W_g \quad (2)$$

In this equation, $K_1$–$K_9$ are constants, h represents vertical position, $\dot{h}$ vertical velocity, $\theta$ and $\dot{\theta}$ represent pitch and pitch rate, respectively, $\Delta V$ represents aircraft deviation from the reference speed, $\delta_e$ represents elevator deflection, $\delta T$ represents thrust change, $U_g$ represents horizontal gust velocity and $W_g$ represents vertical gust velocity. Also, the angle of attack ($\alpha$) terms have been expressed as a function of $\theta$ and h. This equation, with the $\delta T$, $U_g$ and $W_g$ terms neglected, was used to replace the vertical acceleration feedback signal in FIG. 2 with its equivalent signal components. The result is the $\theta$ control law of FIG. 9. This system has stability and elevator response characteristics identical to the control law of FIG. 2, although all the gains are different. It was found that the $\Delta V$ term has little effect on stability and can therefore be eliminated. The turbulence response of the two control laws are entirely different, since the gust terms were omitted in the $\ddot{h}$ replacement. It is not surprising that the gust response of the control law of FIG. 9, with $K_{\Delta V}$ is generally poorer than for the control law of FIG. 2, as is illustrated in FIG. 10. However, in the frequency range above 1 radian per second the $\theta/\dot{\theta}$ control law of FIG. 9 with $K_{\Delta V}=0$ has the best response.

Figure 9:
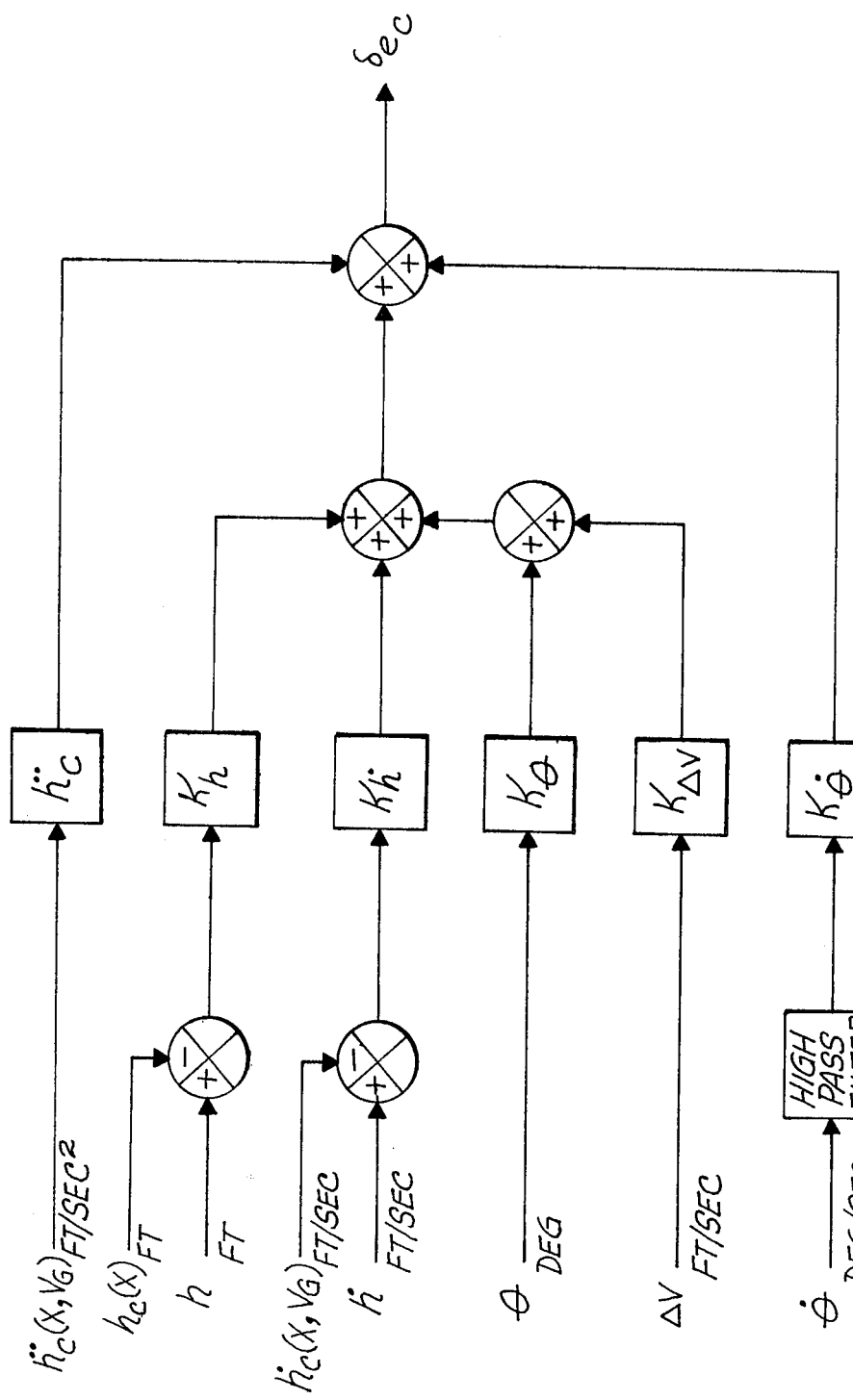
FIG. 9 is a block diagram illustrating implementation of a $\theta/\dot{\theta}$ inner loop control system which for one specific combination of gains exhibits stability characteristics identical to the system of FIG. 2.
Figure 10:
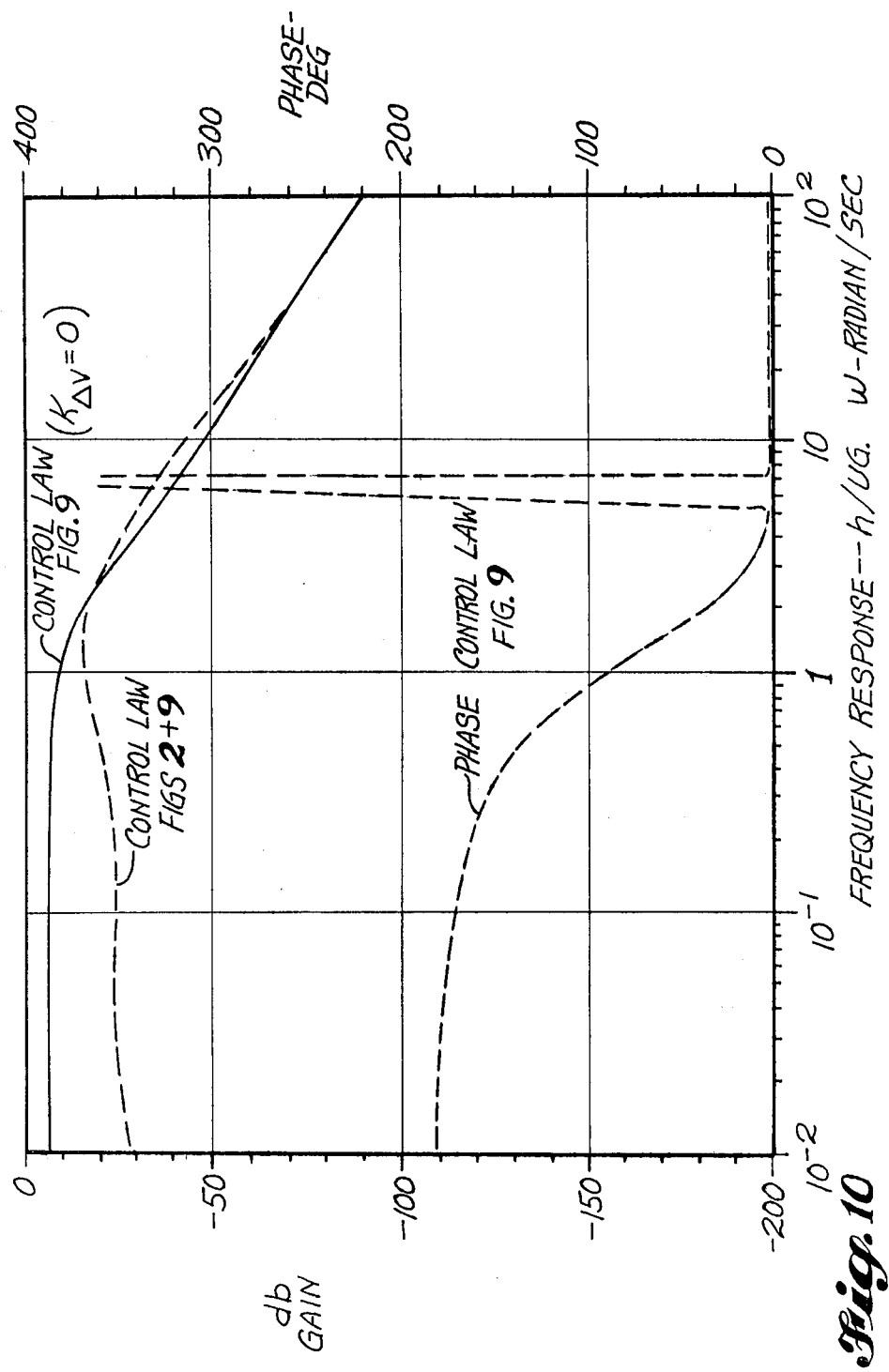
FIG. 10 is a graph illustrating the frequency responses of altitude deviation due to horizontal gust for the control law design shown in FIGS. 2 and 9.

An overall superior control law can therefore be synthesized using the $\ddot{h}/\dot{\theta}$ control law of FIG. 2 for the low frequency range and the $\theta/\dot{\theta}$ control law of FIG. 9 for the high frequency range. These two control laws can be coupled together to work in their respective best frequency ranges, again using complementary filtering techniques. The resultant system is illustrated in FIG. 11.

Figure 11:
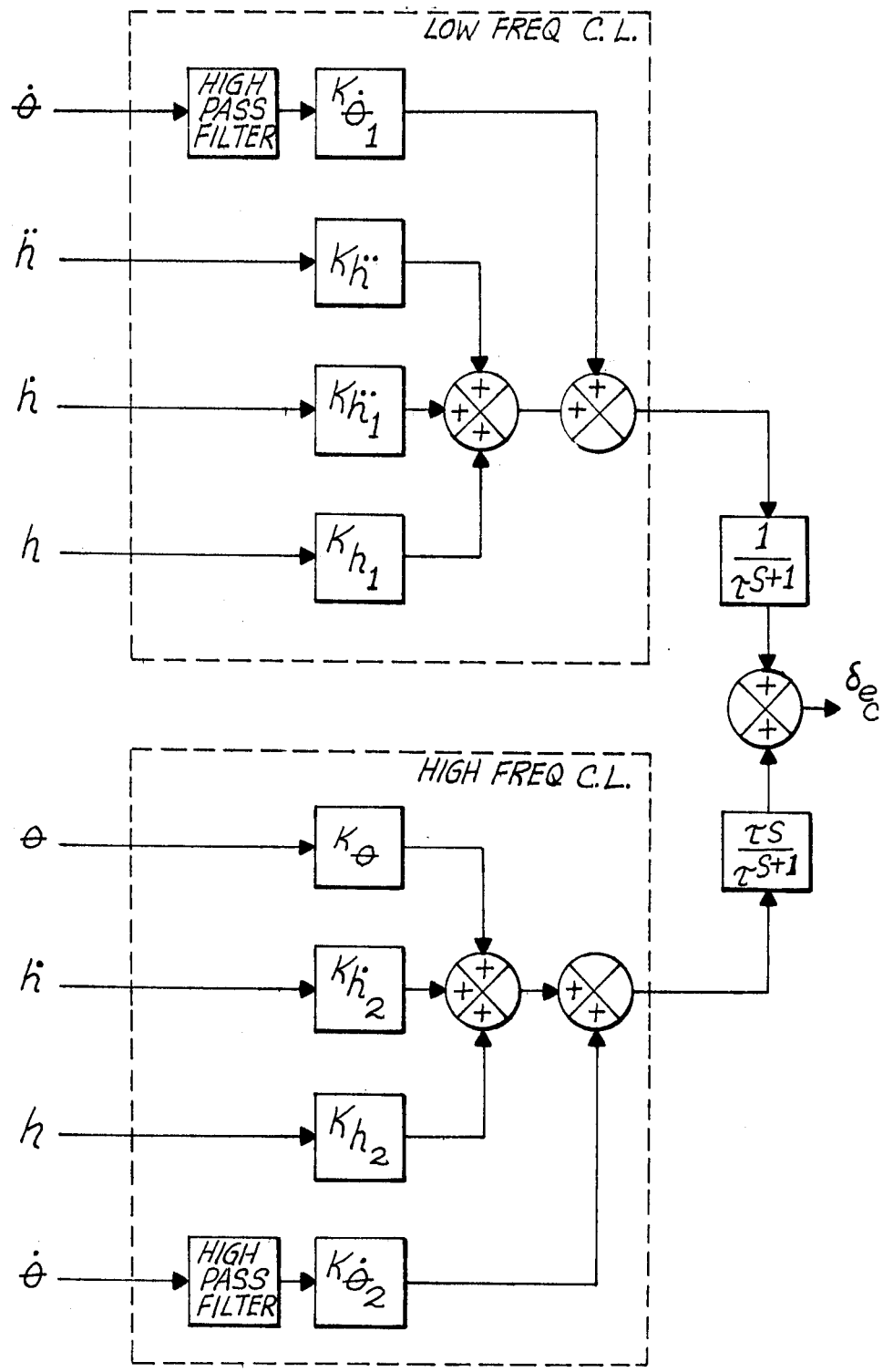
FIG. 11 is a block diagram of a control system which utilizes an $\ddot{h}/\dot{\theta}$ inner loop control in the low frequency range and the $\theta/\dot{\theta}$ inner loop control in the high frequency range.
Figure 12:
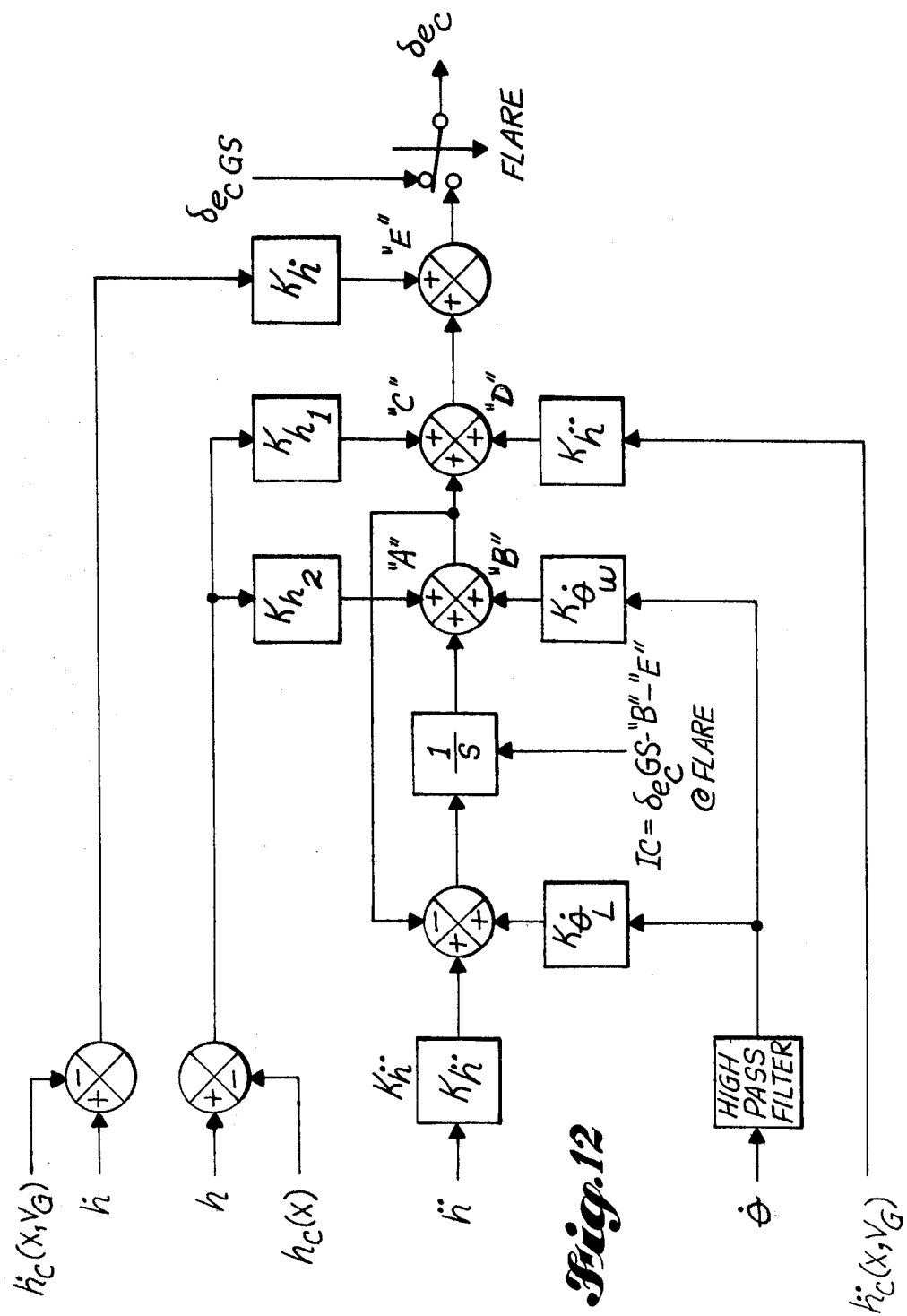
FIG. 12 is a block diagram illustrating the system of FIG. 11 reduced to a simplified form.

The system of FIG. 11 can be reduced to a simplified form shown in FIG. 12. This control law was evaluated in a simulation and demonstrated very good performance characteristics.

Figure 13:
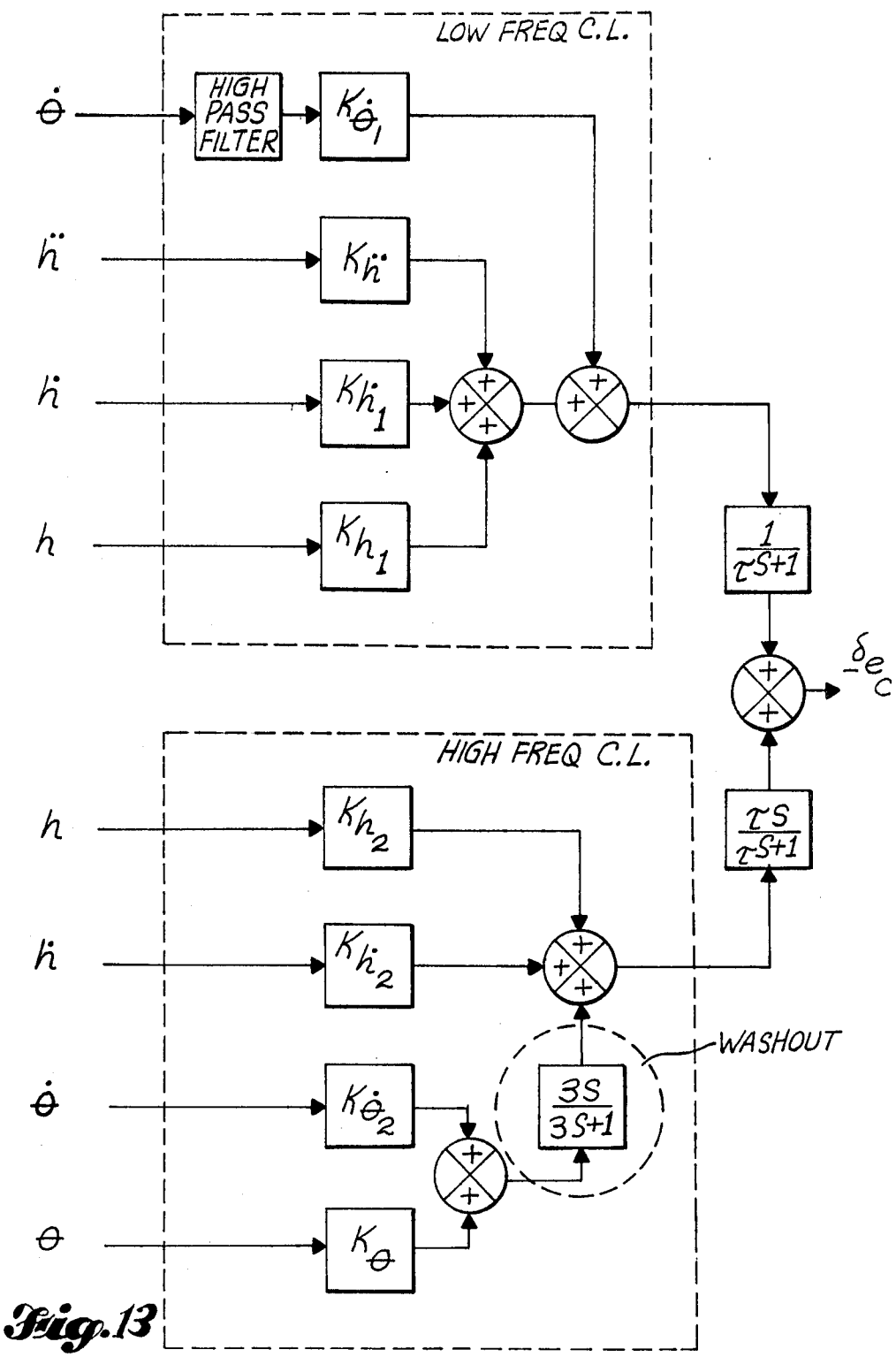
FIG. 13 is a block diagram showing the $\theta/\dot{\theta}$ control law system of FIG. 9 with the addition of a washout circuit on the $\theta$ and $\dot{\theta}$ feedback signals.

Further improvements were found possible. The gust response of the $\theta/\dot{\theta}$ control law of FIG. 9 was improved by placing a washout circuit on the $\theta$ and $\dot{\theta}$ feedback signals. The resulting system is shown in FIG. 13. This frees the pitching motion in the low frequency range and thus helps to alleviate gust loads and keep the airplane on its path.

Figure 14:
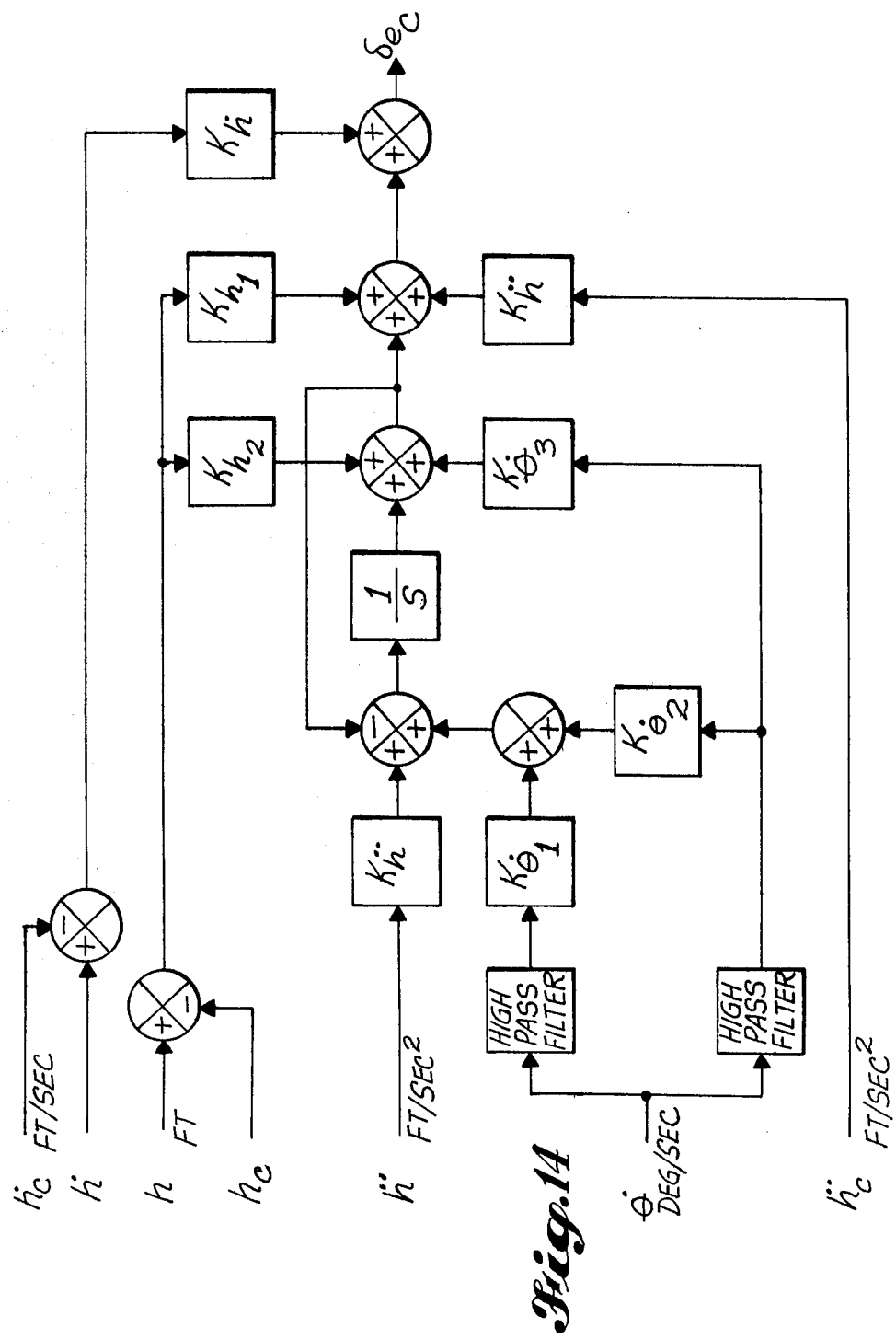
FIG. 14 is a block diagram of the complemented form of the system shown in FIG. 13.

Incorporating complementation, the resulting system is shown in FIG. 14. For this control law full performance evaluation was conducted on a simulator and in flight tests. The results showed an approximately 50 percent reduction in touchdown dispersion over the base line system.

Figure 15:
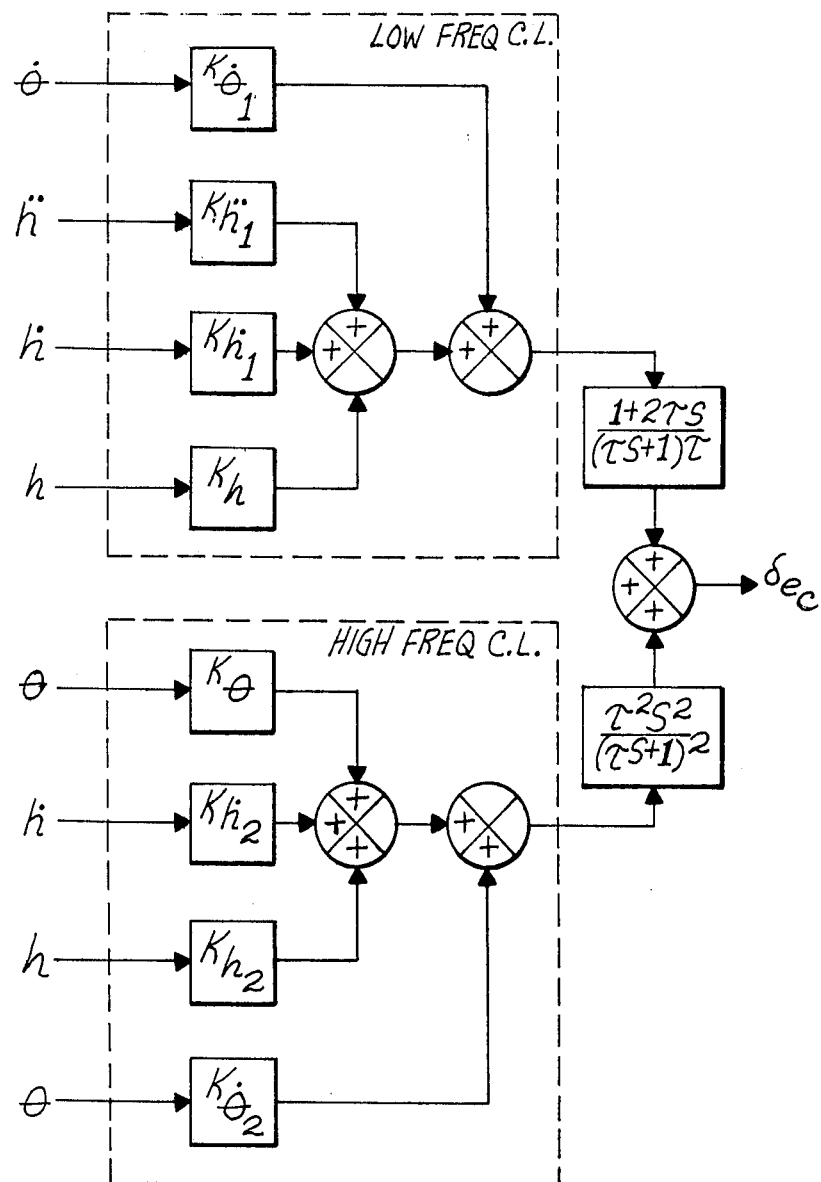
FIG. 15 is a block diagram of a system which couples together the systems of FIGS. 2 and 9 by means of a second order complementary filter.
Figure 16:
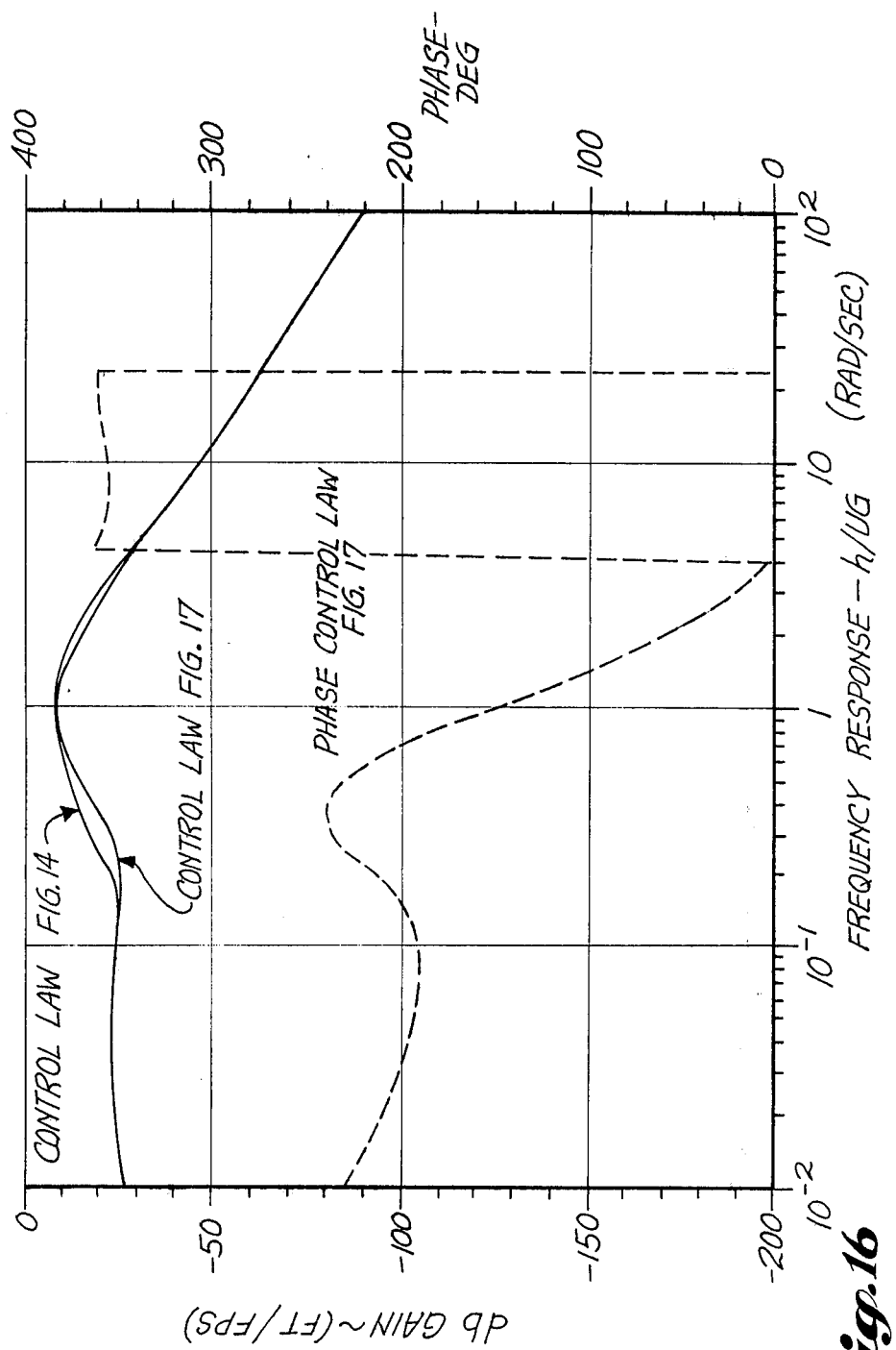
FIG. 16 is a graph illustrating a response of the systems shown in FIGS. 15 and 17.

The control laws of FIGS. 2 and 9 can be coupled together by means of a second order complementary filter. The result is shown in FIG. 15. This produces yet a better adherence to the $\ddot{h}/\dot{\theta}$ control law frequency response for low frequencies and the $\theta/\dot{\theta}$ control law frequency response for the high frequencies, as is shown in FIG. 16. After combining all like terms in FIG. 15, the control law of FIG. 15 reduces to the form shown in FIG. 17. Besides high gain (bandwidth), good stability, the best gust response, low elevator activity and insensitivity to $\ddot{h}$ signal anomalies, this control law features an inherent washout on the inner loop signals $\ddot{h}$ and $\dot{\theta}$, thereby making the control law immune to static or low frequency inner loop sensor errors. This is of special importance in autoland control law design, where sensor bias errors can otherwise cause tracking offsets resulting in unacceptable autoland performance.

Additional, important features realized with the control laws of FIGS. 8, 12, 14 and 17 are implicit h signal derivation and complete control law initialization, thereby eliminating pre-flare terrain effects.

Figure 17:
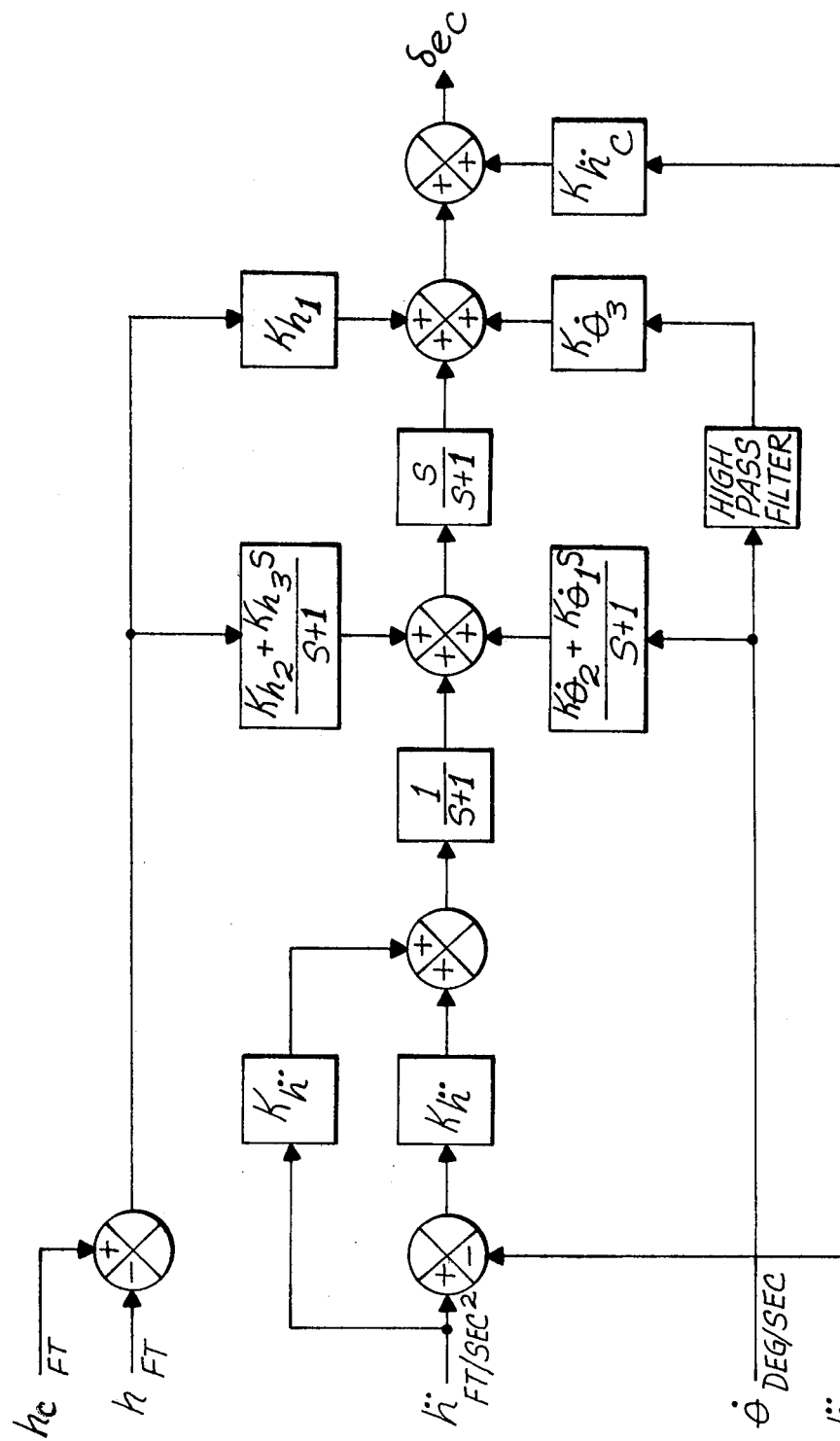
FIG. 17 is a block diagram of a system derived from combining all like terms in the system of FIG. 15.

The implicit $\ddot{h}$ signal derivation in the control law of FIG. 17 is evident; no $\ddot{h}$ signal feedback appears in the control law. This is especially attractive because it is difficult to obtain an accurate $\ddot{h}$ signal.

The h and $\theta$ lag filters are initialized at zero, with the $\dot{h}$ lag filter being initialized to carry the last computed elevator command from the previous control mode. The washout filters need not be initialized. Since none of the filters carry pre-flare signal information, pre-flare signal characteristics such as are exhibited by radar altitude cannot effect the flare.

The control law of FIG. 12 will be used to show how the complementary washout/lag filter may be employed to achieve the same result.

A sink rate signal with desired characteristics can be synthesized from radio altitude $h_R$ and vertical acceleration from an inertial reference system ($\ddot{h}_{IRS}$) as:

$$\dot{\hat{h}} = \frac{\tau \ddot{h}_{IRS}}{\tau S + 1} + \frac{S}{\tau S + 1} \frac{h_R}{\tau} \quad (3)$$

Figure 18:
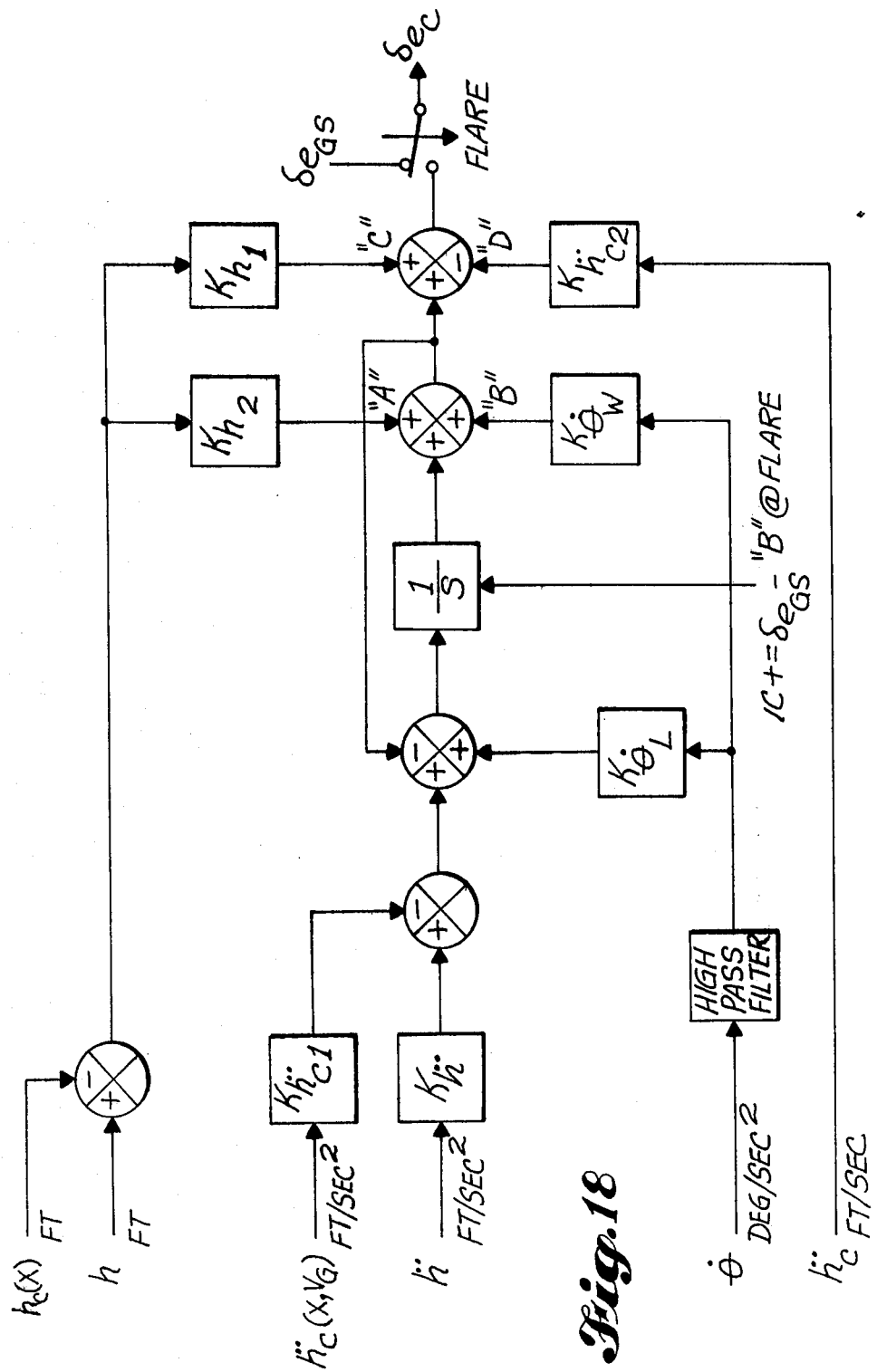
FIG. 18 is a variant of the system shown in FIG. 12 wherein the h signal is produced at the output of the complementary filter.

Both the lagged $\ddot{h}_{IRS}$ and the washed out $h_R$ signal components are already developed in the washout/lag complementary filter shown in FIGS. 12 and 14. The h signal can therefore be produced on the output of this complementary filter with the desired gain simply by increasing the $\ddot{h}$ and h input gains in this filter. This is shown for the control law of FIG. 12 in FIG. 18. A typical filter time constant of one second is used which is suitable for both the $\dot{h}$ signal derivation and for the $\ddot{h}/\dot{\theta}$ complementation.

Since, in the control laws of FIGS. 8, 12 and 14, the complementary filter is the only one requiring initialization, it may be used to carry the last command from the previous control mode as the initial condition, thereby again avoiding pre-flare sensor history effects.

In summary, an improved pitch control inner loop feedback system has been described which allows higher control law gains with good system stability. The system realizes improved path tracking and turbulence, lower pitching and elevator activity and improved touchdown dispersions.

These results are achieved through a complementary $\ddot{h}/\dot{\theta}$ filtering technique. This technique further provides implicit sink rate signal derivation and control law initialization preventing pre-flare signal histories (e.g. terrain effects on radio altitude) from affecting the flare control.

A final control law is described having, besides the above features, the added characteristic of washing out all inner loop feedback signals, thereby further reducing the effects of low frequency sensor errors on the landing performance.

While preferred embodiments of the invention have been described in detail, it should be apparent that many modifications and variations thereto are possible, all of which fall within the true spirit and scope of the invention.

We claim:

1. In an aircraft flight control system wherein inner loop damping signals are combined with outer loop command signals to produce an elevator control signal, improved inner loop damping signal apparatus comprising:
    means for providing a signal $\ddot{h}$ representative of aircraft vertical acceleration;
    means for amplifying said $\ddot{h}$ signal by a predetermined gain factor $K_{\ddot{h}}$;
    means for providing a signal $\theta$ representative of aircraft pitch;
    means for amplifying said $\theta$ signal by a predetermined gain factor $K_\theta$;
    low pass filter means for attenuating said $\ddot{h}$ signal above a predetermined frequency $\omega$;
    high pass filter means for attenuating said $\theta$ signal below said frequency $\omega$;
    means for providing a signal $\dot{\theta}$ representative of aircraft pitch rate;
    means for amplifying said $\dot{\theta}$ signal by a predetermined gain factor $K_{\dot{\theta}}$; and
    summer means for summing said low pass filtered $\ddot{h}$ signal, said high pass filtered $\theta$ signal, said amplified $\dot{\theta}$ signals and the outer loop command signal to thereby produce the control signal.

2. In an aircraft flight control system wherein inner loop damping signals are combined with outer loop command signals to produce an elevator control signal, improved inner loop damping signal apparatus comprising:
    means for providing an aircraft vertical acceleration signal $\ddot{h}$;
    means for providing an aircraft pitch rate signal $\dot{\theta}$;
    means for amplifying said $\ddot{h}$ and $\dot{\theta}$ signals by predetermined gain factors;
    first low pass filter means for attenuating said vertical acceleration signal $\ddot{h}$ above a predetermined frequency $\omega$;
    high pass filter means for attenuating said pitch rate signal $\dot{\theta}$ below said predetermined frequency $\omega$;
    second low pass filter means for attenuating said pitch rate signal $\dot{\theta}$ above said predetermined frequency $\omega$; and
    summer means for summing said low pass filtered h and said high pass and low pass filtered $\theta$ signals to produce an inner loop damping signal.

3. In an aircarft flight control system wherein an inner loop command signal is combined with an outer loop damping signal to produce an elevator control signal, an improved method of producing said inner loop damping signal comprising the steps of:
    (a) providing an aircraft vertical acceleration signal $\ddot{h}$;
    (b) providing an aircraft pitch rate signal $\dot{\theta}$;
    (c) amplifying said $\ddot{h}$ and $\dot{\theta}$ signals by predetermined gain factors;
    (d) attenuating said vertical acceleration signal $\ddot{h}$ above a predetermined frequency $\omega$;
    (e) attenuating said pitch rate signal $\dot{\theta}$ below said predetermined frequency $\omega$;
    (f) attenuating said pitch rate signal above said predetermined frequency $\omega$; and
    (g) summing said attenuated $\ddot{h}$ and $\dot{\theta}$ signals from steps (d), (e) and (f) to produce the inner loop signal.

4. In an aircraft flight control system, apparatus for producing an elevator control signal, the apparatus comprising:

means for providing signals $\theta$ and $\dot{\theta}$ representative of aircraft pitch and pitch rate, respectively;

means for providing signals h, $\dot{h}$ and $\ddot{h}$ representative of aircraft altitude, altitude rate and vertical acceleration, respectively;

first high pass filtering means for attenuating said $\theta$ signal below a predetermined frequency;

first amplifying means for amplifying each of said $\dot{\theta}$, h, $\dot{h}$ and $\ddot{h}$ signals by individual predetermined gain factors;

first summing means for summing said amplified h, $\dot{h}$ and $\ddot{h}$ signals and the amplified and high pass filtered $\theta$ signal;

second high pass filter means for attenuating said $\theta$ signal below a predetermined frequency;

second amplifying means for amplifying each of said $\theta$, $\dot{\theta}$, h and $\dot{h}$ signals by individual predetermined gain factors;

second high pass filter means for attenuating said amplified $\dot{\theta}$ below a predetermined frequency;

second summing means for summing said amplified $\theta$, h and $\dot{h}$ signals and the amplified and high pass filtered $\dot{\theta}$ signal; and complementary filter means for outputting said first summing means signal at frequencies below a predetermined frequency and outputting said second summing means signal at frequencies above said predetermined frequency, whereby the output of said complementary filter means is said produced elevator control signal.

5. In an aircraft flight control system wherein inner loop damping signals are combined with outer loop command signals to produce an elevator control signal, apparatus for producing an improved inner loop damping signal, the apparatus comprising:

means for providing signals h and $\ddot{h}$ representative of aircraft altitude and vertical acceleration, respectively;

means for providing a signal $\dot{\theta}$ representative of aircraft pitch rate;

high pass filter means for attenuating said $\dot{\theta}$ below a predetermined frequency $\omega_0$;

first circuit means for amplifying said $\ddot{h}$ signal by a predetermined gain factor and predeterminedly attenuating said amplified $\ddot{h}$ signal above a predetermined frequency $\omega$;

second circuit means for amplifying the output of said high pass filter by a predetermined gain factor and predeterminedly attenuating the resultant signal above said frequency $\omega$;

third circuit means for amplifying the output of said high pass filter by a predetermined gain factor and predeterminedly attenuating the resultant signal below said frequency $\omega$;

fourth circuit means for amplifying said h signal by a predetermined gain factor and attenuating said amplified h signal below said frequency $\omega$;

combiner means for combining the outputs from said first, second, third and fourth circuit means to thereby provide said inner loop damping signal.

6. In an aircraft flight control system, apparatus for producing an elevator control signal, the apparatus comprising:

means for providing signals $\theta$ and $\dot{\theta}$ representative of aircraft pitch and pitch rate, respectively;

means for providing signal h, $\dot{h}$ and $\ddot{h}$ representative of aircraft altitude, altitude rate and vertical acceleration, respectively;

first high pass filtering means for attenuating said $\theta$ signal below a predetermined frequency;

first amplifying means for amplifying each of said $\dot{\theta}$, h, $\dot{h}$ and $\ddot{h}$ signals by individual predetermined gain factors;

first summing means for summing said amplified h, $\dot{h}$ and $\ddot{h}$ signals and the high pass filtered and amplified $\theta$ signal;

second amplifying means for amplifying each of said $\theta$, $\dot{\theta}$, h and $\dot{h}$ signals by individual predetermined gain factors;

second summing means for summing said amplified $\theta$ and $\dot{\theta}$ signals;

washout filter means for high pass filtering the output of said second summer means;

third summing means for summing said amplified h and $\dot{h}$ signals and the output of said washout filter means; and complementary filter means for outputting said first summing means signal at frequencies below a predetermined frequency and outputting said third summing means signal at frequencies above said predetermined frequency, whereby the output of said complementary filter means is said produced elevator control signal.

7. In an aircraft flight control system wherein inner loop damping signals are combined with outer loop command signals to produce an elevator control signal, apparatus for producing an improved inner loop damping signal, the apparatus comprising:

means for providing signals h and $\ddot{h}$ representative of aircraft altitude, altitude rate and vertical acceleration, respectively;

means for providing a signal $\dot{\theta}$ representative of aircraft pitch rate;

first circuit means for amplifying said $\dot{\theta}$ signal by a first predetermined gain factor and attenuating the resultant signal below a predetermined frequency $\omega_1$;

second circuit means for amplifying said $\dot{\theta}$ signal by a second predetermined gain factor and attenuating the resultant signal below a predetermined frequency $\omega_2$;

third circuit means for attenuating the output signal of the first circuit means above a predetermined frequency $\omega$;

fourth circuit means for attenuating the output signal from the second circuit means above the predetermined frequency $\omega$;

fifth circuit means for amplifying said $\ddot{h}$ signal by a third predetermined gain factor and attenuating the resultant signal above the frequency $\omega$;

sixth circuit means for amplifying said h signal by a fourth predetermined gain factor and;

combiner means for combining the signals produced by the second third, fourth, fifth, and sixth circuit means to thereby produce said inner loop damping signal.

* * * * *